United States Patent
Lu et al.

(10) Patent No.: US 12,071,587 B1
(45) Date of Patent: Aug. 27, 2024

(54) ANTI-CORROSION AND LOW-HEAT-CONDUCTION ANNULUS PROTECTION FLUID FOR DEEP-SEA OIL AND GAS EXPLOITATION AND PREPARATION METHOD THEREOF

(71) Applicants: Qingdao University of Technology, Qingdao (CN); China University of Petroleum (East China), Qingdao (CN)

(72) Inventors: Chang Lu, Qingdao (CN); Yuhuan Bu, Qingdao (CN); Shaorui Jing, Qingdao (CN); Shenglai Guo, Qingdao (CN); Huajie Liu, Qingdao (CN); Heng Yang, Qingdao (CN)

(73) Assignees: Qingdao University of Technology, Qingdao (CN); China University of Petroleum (East China), Qingdao (CN)

( * ) Notice: Subject to any disclaimer, the term of this patent is extended or adjusted under 35 U.S.C. 154(b) by 0 days.

(21) Appl. No.: 18/433,333

(22) Filed: Feb. 5, 2024

(30) Foreign Application Priority Data

Jun. 25, 2023 (CN) .......................... 202310745659.9

(51) Int. Cl.
*C09K 8/54* (2006.01)
(52) U.S. Cl.
CPC ............ *C09K 8/54* (2013.01); *C09K 2208/32* (2013.01)
(58) Field of Classification Search
None
See application file for complete search history.

(56) References Cited

U.S. PATENT DOCUMENTS

| 7,703,516 B2 * | 4/2010 | Hills ...................... C23F 14/00 166/264 |
| 8,215,398 B2 * | 7/2012 | Kesavan .................. C02F 5/10 510/109 |
| 9,464,222 B2 * | 10/2016 | Zhang ................... C09K 8/035 |

(Continued)

FOREIGN PATENT DOCUMENTS

| CN | 104629701 A | 5/2015 |
| CN | 104927807 A | 9/2015 |

(Continued)

*Primary Examiner* — John J Figueroa
(74) *Attorney, Agent, or Firm* — Bayramoglu Law Offices LLC

(57) ABSTRACT

Anti-corrosion and low-heat-conduction annulus protection fluid for deep-sea oil and gas exploitation and a preparation method thereof are provided. The annulus protection fluid includes: a polymer solution: 100 parts, clear water III: 100 parts to 500 parts, a thermally-insulating material: 20 parts, a corrosion inhibitor: 1 part to 7 parts, and xanthan gum: 0.3 parts to 0.5 parts, wherein the polymer solution is a mixture of a polymer and clear water II in a mass ratio of 1:(22-28); and the polymer includes the following raw materials: clear water I: 100 parts, an acrylamide: 15 parts to 20 parts, 2-2-methylpropanesulfonic acid: 5 parts to 10 parts, a cross-linking agent: 0.1 parts to 0.3 parts, and an initiator: 0.5 parts to 1 part. The annulus protection fluid exhibits excellent thermal insulation performance and corrosion resistance, and avoids the generation of hydrates and the decomposition of hydrate layers at a wellhead.

2 Claims, 2 Drawing Sheets

(56) References Cited

U.S. PATENT DOCUMENTS

| | | | |
|---|---|---|---|
| 10,703,965 B2* | 7/2020 | Pravesh | C09K 8/82 |
| 2004/0059054 A1* | 3/2004 | Lopez | C09K 8/592 |
| | | | 525/54.31 |
| 2007/0125987 A1* | 6/2007 | Hills | C08F 2/005 |
| | | | 422/7 |
| 2014/0014335 A1* | 1/2014 | Jones | E21B 43/14 |
| | | | 526/263 |
| 2019/0177603 A1* | 6/2019 | Abad | C09K 8/506 |

FOREIGN PATENT DOCUMENTS

| | | |
|---|---|---|
| CN | 105038740 A | 11/2015 |
| CN | 107957480 A | 4/2018 |
| CN | 110295031 A | 10/2019 |
| CN | 112094091 A | 12/2020 |
| CN | 114507513 A | 5/2022 |
| CN | 115595127 A | 1/2023 |
| CN | 115893920 A | 4/2023 |

* cited by examiner

ANTI-CORROSION AND LOW-HEAT-CONDUCTION ANNULUS PROTECTION FLUID FOR DEEP-SEA OIL AND GAS EXPLOITATION AND PREPARATION METHOD THEREOF

CROSS REFERENCE TO THE RELATED APPLICATIONS

This application is based upon and claims priority to Chinese Patent Application No. 202310745659.9, filed on Jun. 25, 2023, the entire contents of which are incorporated herein by reference.

TECHNICAL FIELD

The present disclosure belongs to the technical field of oilfield chemistry, and specifically relates to an anti-corrosion and low-heat-conduction annulus protection fluid for deep-sea oil and gas exploitation and a preparation method thereof.

BACKGROUND

During deepwater oil and gas well exploitation, once the heat exchange rate between a high-temperature fluid inside a wellbore and an external low-temperature environment is too high, the temperature of the fluid inside the wellbore will decrease rapidly, which makes it easy to meet the low-temperature and high-pressure conditions required for hydrate production. Once hydrate generation and deposition occur in a deepwater wellbore, the exploitation of the deepwater gas well will face serious hydrate flow obstacles, and in serious cases, the wellhead will be blocked, which will heavily affect the exploitation process of the deepwater gas well, and cause huge economic losses, and may even cause safety accidents. In addition, once excessive wellbore heat is transferred to a penetrating hydrate layer, the hydrate layer will be decomposed, which will cause smoking or fluid channeling at the wellhead, and in serious cases, may lead to the destruction of the entire well.

Outside China, annulus protection fluids are generally called packer fluids and are a type of completion fluid. A traditional packer fluid refers to a fluid filled between a tubing and a production casing and has characteristics such as long-term stability, corrosion resistance, and reservoir protection. With the development of the offshore oil and gas field industry, fluids injected into an annulus between a riser and a tubing in an offshore oil and gas well and an annulus between an inner riser and an outer riser are also called packer fluids, which mainly play a thermal insulation role. According to the property of the continuous phase of the fluid, packer fluids can be classified into the following three categories: gas-based packer fluids, oil-based packer fluids, and water-based packer fluids. At present, the gas-based packer fluids and the oil-based packer fluids are less used, and the water-based packer fluids are widely used at home and abroad.

Therefore, in order to maintain a wellbore temperature to avoid the generation of hydrates and the decomposition of a hydrate layer and protect a casing string from being corroded, a unique environment for deepwater oil and gas well is fully considered, preventing the heat of a thermal fluid in a wellbore from spreading to the formation. In combination with the wellbore thermal insulation technologies currently used at home and abroad, relatively mature and efficient packer fluid technologies in various thermal insulation measures are subjected to comparative analysis in order to develop an annulus protection fluid system with excellent thermal insulation performance and corrosion resistance, which has very important theoretical significance and practical values for effectively avoiding the generation of hydrates and the decomposition of a hydrate layer at a wellhead, and for realizing the corrosion of a casing string in a wellbore during a production process.

SUMMARY

In view of the above problems, the present disclosure is intended to provide an anti-corrosion and low-heat-conduction annulus protection fluid for deep-sea oil and gas exploitation, which can improve the thermal insulation performance of a wellbore, prevent the corrosion of a casing string, and avoid the generation of hydrates and the decomposition of a hydrate layer at a wellhead during a production process.

In order to allow the above objective, the annulus protection fluid of the present disclosure is prepared from the following raw materials: a polymer solution: 100 parts, clear water III: 100 parts to 500 parts, a thermally-insulating material: 20 parts, a corrosion inhibitor: 1 part to 7 parts, and xanthan gum: 0.3 parts to 0.5 parts,
  where the polymer solution is a mixture of a polymer and clear water II in a mass ratio of 1:(22-28); and
  the polymer is prepared from the following raw materials: clear water I: 100 parts, an acrylamide: 15 parts to 20 parts, 2-acrylamido-2-methylpropanesulfonic acid: 5 parts to 10 parts, a crosslinking agent: 0.1 parts to 0.3 parts, and an initiator: 0.5 parts to 1 part.

The present disclosure also provides a preparation method of the anti-corrosion and low-heat-conduction annulus protection fluid for deep-sea oil and gas exploitation described above, including the following steps:
(1) taking 50% to 80% of a mass of the clear water I, adding the acrylamide, the 2-acrylamido-2-methylpropanesulfonic acid, and the crosslinking agent under stirring, and further stirring until a solution is transparent to obtain a solution I;
(2) taking the remaining part of the clear water I, adding the initiator under stirring, and further stirring until dissolution to obtain second solution II;
(3) adding the solution II dropwise to the solution I under stirring, and standing to obtain the polymer;
(4) mixing the polymer with the clear water II under stirring to obtain the polymer solution;
(5) mixing the polymer solution with the clear water III under stirring to obtain a solution III;
(6) pouring the xanthan gum into the solution III under stirring, and further stirring until completely dissolved to obtain a solution IV, which is a complex mixed solution;
(7) adding the corrosion inhibitor to the solution IV, and thoroughly stirring to obtain a solution V; and
(8) adding the thermally-insulating material to the solution V, and thoroughly stirring to obtain the annulus protection fluid.

In the step (3), the standing is conducted at 50° C. to 70° C. for 8 h to 12 h.

In the present disclosure, the 2-acrylamido-2-methylpropanesulfonic acid can effectively inhibit the hydrolysis of amido in the acrylamide in the polymer, thereby ensuring that the polymer still exhibits an excellent water absorption and retention capacity under high-temperature, high-salt, and high-pressure conditions.

The use of the polymer solution as a suspension stabilizer can effectively make Y6000 hollow glass microspheres stably dispersed in the polymer solution, and the polymer has the characteristics of absorbing water and swelling, which can improve a viscosity of the system and reduce a natural convection heat loss. However, because a pure polymer solution has an extremely-high viscosity and can hardly be stirred, the polymer solution is mixed with clear water in a specified ratio, and then a xanthan gum solid is added to improve the problem of difficult stirring. The addition of xanthan gum improves a viscosity of the system and can also improve the stability, such that Y6000 hollow glass microspheres can be stably suspended in the solution.

The thermal insulation performance of the annulus protection fluid of the present disclosure during working is mainly based on the following theories: (1) Heat transfer in an annulus includes heat conduction, natural convection, and radiative heat transfer, among which the first two are dominant. (2) The smaller the thermal conductivity of a fluid filled in an annulus, the smaller the heat conduction loss. (3) Natural convective heat transfer in a closed annulus is natural convective heat transfer in a limited space. In this case, the greater the viscosity of a fluid, the smaller the Grashof number and the weaker the natural convective heat transfer or the natural convective heat transfer even completely disappears.

The thermal insulation performance of the annulus protection fluid is mainly brought by the hollow glass microspheres, and is partly brought by the addition of the polymer solution and the xanthan gum solid as a tackifier. In order to reduce a natural convection heat loss, the polymer solution and the xanthan gum solid as a tackifier are added to the system, which are intended to make the system have a high viscosity in an annulus, thereby allowing a decline of a natural convection heat loss.

In use, the polymer solution is mixed well with clear water, then the xanthan gum solid is added, and further stir until the xanthan gum solid is completely dissolved; then the corrosion inhibitor is added and thoroughly stirred; and then the hollow glass microspheres are added and thoroughly stirred. The annulus protection fluid is used at 25° C. to 75° C.

The annulus protection fluid of the present disclosure has a minimum thermal conductivity of 0.3053 $W \cdot m^{-1} \cdot K^{-1}$ and a density of 0.95 $g \cdot cm^{-3}$ to 0.98 $g \cdot cm^{-3}$, exhibits excellent rheology, suspension stability, and long-term stability, and undergoes no stratification, degradation, deterioration, and thickening phenomena after being placed at room temperature for 3 or more months, which meets the construction requirements.

DETAILED DESCRIPTION OF THE EMBODIMENTS

Figure 1:
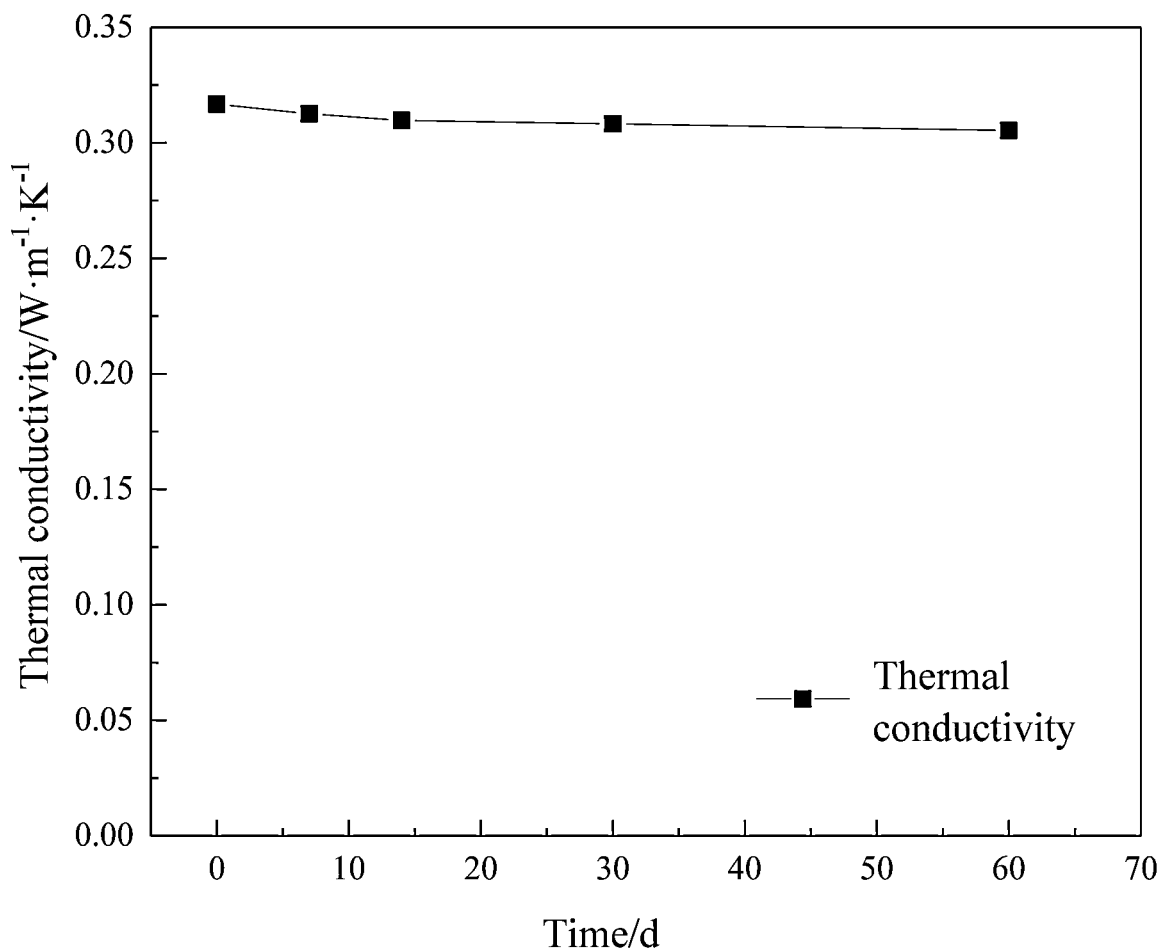
FIG. 1 shows test results of long-term thermal insulation performance of an annulus protection fluid (HKBHY)

The present disclosure will be described in detail below.
1. A synthesized polymer is thoroughly mixed with clear water in an appropriate ratio under stirring to obtain a polymer solution for later use.
2. Four preferred thermally-insulating materials are selected from the common thermally-insulating materials.
3. The four preferred thermally-insulating materials each are added at a same amount to each of polymer solutions with different polymer concentrations to determine whether a thermally-insulating material can be stably dispersed in a polymer solution.
4. A polymer concentration that allows the stable dispersion of a thermally-insulating material and a thermally-insulating material that can be stably suspended in a polymer solution are determined.
5. Because a pure polymer solution has a high viscosity and can hardly be stirred, a polymer solution with a specified polymer concentration is mixed with clear water in different ratios, and then a suspension stabilizer is added to solve the problem of difficult stirring due to a high viscosity.
6. The preferred polymer solution, the preferred thermally-insulating material, and the suspension stabilizer obtained in the above 1 to 5 are used to prepare annulus protection fluids in different ratios, and thermal conductivities, thermal insulation effects, and anti-corrosion effects of these annulus protection fluids are tested; and according to test results, a formula allowing the optimal thermal insulation and anti-corrosion effects is finally screened out.

Example 1

A polymer was mixed with clear water in a mass ratio of 1:22, and then stirred at a high speed to obtain a polymer solution, which was denoted as JH-1.
A polymer was mixed with clear water in a mass ratio of 1:24, and then stirred at a high speed to obtain a polymer solution, which was denoted as JH-2.
A polymer was mixed with clear water in a mass ratio of 1:26, and then stirred at a high speed to obtain a polymer solution, which was denoted as JH-3.
A polymer was mixed with clear water in a mass ratio of 1:28, and then stirred at a high speed to obtain a polymer solution, which was denoted as JH-4.

Example 2

Four different thermally-insulating materials (artificial floating beads, fly ash floating beads, Y6000 hollow glass microspheres, and expanded perlite) were weighed in a mass fraction of 5% in a polymer solution and denoted as RG-1, FMH-1, Y6000-1, and PZ-1, respectively.

Example 3

Y6000 hollow glass microspheres were weighed in a mass fraction of 20% in a polymer solution and denoted as Y6000-2.

Example 4

JH-2 and clear water were mixed in a mass ratio of 1:1, then 0.3% (which referred to 0.3% of a total mass of JH-2) of a xanthan gum powder was added to the mixture, and stirred at a high speed to obtain a complex mixed solution, which was denoted as JHH-1.

Example 5

JH-2 and clear water were mixed in a mass ratio of 1:2, then 0.3% (which referred to 0.3% of a total mass of JH-2) of a xanthan gum powder was added to the mixture, and stirred at a high speed to obtain a complex mixed solution, which was denoted as JHH-2.

Example 6

JH-2 and clear water were mixed in a mass ratio of 1:3, then 0.35% (which referred to 0.35% of a total mass of JH-2) of a xanthan gum powder was added to the mixture, and stirred at a high speed to obtain a complex mixed solution, which was denoted as JHH-3.

Example 7

JH-2 and clear water were mixed in a mass ratio of 1:4, then 0.35% (which referred to 0.35% of a total mass of JH-2) of a xanthan gum powder was added to the mixture, and stirred at a high speed to obtain a complex mixed solution, which was denoted as JHH-4.

Example 8

JH-2 and clear water were mixed in a mass ratio of 1:5, then 0.45% (which referred to 0.45% of a total mass of JH-2) of a xanthan gum powder was added to the mixture, and stirred at a high speed to obtain a complex mixed solution, which was denoted as JHH-5.

Example 9

1% (which referred to 1% of a total mass of JH-2) of a corrosion inhibitor was added to JHH-2, and thoroughly stirred to obtain a solution JHHH-1.

Example 10

3% (which referred to 3% of a total mass of JH-2) of a corrosion inhibitor was added to JHH-2, and thoroughly stirred to obtain a solution JHHH-2.

Example 11

5% (which referred to 5% of a total mass of JH-2) of a corrosion inhibitor was added to JHH-2, and thoroughly stirred to obtain a solution JHHH-3.

Example 12

7% (which referred to 7% of a total mass of JH-2) of a corrosion inhibitor was added to JHH-2, and thoroughly stirred to obtain a solution JHHH-4.

Test Example 1

The RG-1, FMH-1, Y6000-1, and PZ-1 in Example 2 each were added to the JH-1, JH-2, JH-3, and JH-4 polymer solutions prepared in Example 1, and thoroughly stirred at a high speed and then placed in a 75° C. desktop drying oven; and the suspension stability of the four thermally-insulating materials in the polymer solutions with different polymer concentrations was tested. Test results are shown in Table 1 below.

TABLE 1

Suspension stability of the different thermally-insulating materials in the polymer solutions with different polymer concentrations

| Formula | Stability |
| --- | --- |
| JH-1 + RG-1 | Unstable |
| JH-1 + FMH-1 | Unstable |
| JH-1 + Y6000-1 | Stable |
| JH-1 + PZ-1 | Stable |
| JH-2 + RG-1 | Unstable |
| JH-2 + FMH-1 | Unstable |
| JH-2 + Y6000-1 | Stable |
| JH-2 + PZ-1 | Stable |
| JH-3 + RG-1 | Unstable |
| JH-3 + FMH-1 | Unstable |
| JH-3 + Y6000-1 | Unstable |
| JH-3 + PZ-1 | Stable |
| JH-4 + RG-1 | Unstable |
| JH-4 + FMH-1 | Unstable |
| JH-4 + Y6000-1 | Unstable |
| JH-4 + PZ-1 | Stable |

It can be seen from the above table that the expanded perlite can be stably suspended in a polymer solution. However, during an actual operation process, the expanded perlite absorbs water quickly after being added to a polymer solution, such that a viscosity of a mixed solution sharply increases and it is difficult to stir the mixed solution. In the formulas JH-1+Y6000-1 and JH-2+Y6000-1, Y6000 hollow glass microspheres can be stably suspended in a polymer solution. Given the stability and whether it is easy to stir, JH-2 is selected as a final polymer solution, and Y6000 hollow glass microspheres (hereinafter referred to as Y6000) are selected as a thermally-insulating material.

Test Example 2

The Y6000-2 in Example 3 was added to the JH-2 polymer solution in Example 1, and thoroughly stirred at a high speed and then tested by a TC3000E thermal conductivity meter for a thermal conductivity, where the testing was conducted three times, and then an average value was taken. Test results are shown in Table 2 below.

TABLE 2

Thermal conductivities of mixed solutions

| Y6000-2 amount/% | First measurement/ (W · m$^{-1}$ · K$^{-1}$) | Second measurement/ (W · m$^{-1}$ · K$^{-1}$) | Third measurement/ (W · m$^{-1}$ · K$^{-1}$) | Average thermal conductivity/ (W · m$^{-1}$ · K$^{-1}$) |
| --- | --- | --- | --- | --- |
| 20 | 0.3165 | 0.3171 | 0.3179 | 0.3171 |

It can be seen from the above table that, compared with the conventional annulus protection fluid (thermal conductivity: 0.62 W·m$^{-1}$·K$^{-1}$), this system has a thermal conductivity reduced by 48.85%; compared with the first-generation annulus protection fluid ABIF (thermal conductivity: 0.52 W·m$^{-1}$·K$^{-1}$) developed by BJ Services, this system has a thermal conductivity reduced by 39.02%; and compared with the second-generation annulus protection fluid ATIF (thermal conductivity: 0.35 W·m$^{-1}$·K$^{-1}$) developed by BJ Services, this system has a thermal conductivity reduced by 9.4%.

Test Example 3

Y6000-2 in Example 3 was added to each of the complex mixed solution JHH-1 of Example 4, the complex mixed solution JHH-2 of Example 5, the complex mixed solution JHH-3 of Example 6, the complex mixed solution JHH-4 of Example 7, and the complex mixed solution JHH-5 of Example 8, and resulting five different composite mixtures each were subjected to rheology evaluation. Rheology evaluation results are shown in Table 3. The five different composite mixtures each were tested by a TC3000E thermal conductivity meter for a thermal conductivity, where the testing was conducted three times, and then an average value was taken. Thermal conductivity test results are shown in Table 4 below.

TABLE 3

Rheology of different complex mixed solution systems at room temperature

| Formula | Density/ (g cm$^{-3}$) | Rotational viscometer readings | | | | | | Fluidity index n |
|---|---|---|---|---|---|---|---|---|
| | | Φ 600 | Φ 300 | Φ 200 | Φ 100 | Φ 6 | Φ 3 | |
| JHH-1 + Y6000-2 | 0.99 | 135 | 101 | 94 | 75 | 30 | 25 | 0.418 |
| JHH-2 + Y6000-2 | 0.95 | 123 | 87 | 70 | 59 | 27 | 24 | 0.499 |
| JHH-3 + Y6000-2 | 0.95 | 107 | 78 | 68 | 56 | 25 | 21 | 0.455 |
| JHH-4 + Y6000-2 | 0.98 | 101 | 72 | 65 | 52 | 23 | 20 | 0.488 |
| JHH-5 + Y6000-2 | 0.96 | 88 | 60 | 51 | 40 | 18 | 15 | 0.552 |

It can be seen from Table 3 that fluidity indexes n of the complex mixed solution systems all are in a range of 0.7 to 0.4 (with reference to a fluidity index range of drilling fluids), indicating that the complex mixed solution systems have excellent rheology.

TABLE 4

Thermal conductivities of different complex mixed solutions with 20% of Y6000-2

| Formula | First measurement/ (W · m$^{-1}$ · K$^{-1}$) | Second measurement/ (W · m$^{-1}$ · K$^{-1}$) | Third measurement/ (W · m$^{-1}$ · K$^{-1}$) | Average thermal conductivity/ (W · m$^{-1}$ · K$^{-1}$) |
|---|---|---|---|---|
| JHH-1 + Y6000-2 | 0.3515 | 0.3287 | 0.3201 | 0.3201 |
| JHH-2 + Y6000-2 | 0.3056 | 0.3078 | 0.3045 | 0.3059 |
| JHH-3 + Y6000-2 | 0.3144 | 0.313 | 0.3125 | 0.3133 |
| JHH-4 + Y6000-2 | 0.3161 | 0.3101 | 0.3112 | 0.3124 |
| JHH-5 + Y6000-2 | 0.3257 | 0.3281 | 0.3259 | 0.3265 |

The results show that, after Y6000-2 is added to a complex mixed solution, the thermal conductivity is reduced by 49.1% on average compared with the conventional annulus protection fluid (thermal conductivity: 0.62 W·m$^{-1}$·K$^{-1}$); the thermal conductivity is reduced by 39.3% on average compared with the first-generation annulus protection fluid ABIF (thermal conductivity: 0.52 W·m$^{-1}$·K$^{-1}$) developed by BJ Services; and the thermal conductivity is reduced by 9.8% on average compared with the second-generation annulus protection fluid ATIF (thermal conductivity: 0.35 W·m$^{-1}$·K$^{-1}$) developed by BJ Services, where the thermal conductivity is reduced most significantly to 0.3059 W·m$^{-1}$·K$^{-1}$ in the case where Y6000-2 is added to JHH-2. This system of JHH-2+Y6000-2 has excellent thermal insulation performance, can effectively prevent the generation of hydrates and the decomposition of a hydrate layer at a wellhead during a deep-sea oil and gas production process, and exhibits excellent rheology, suspension stability, and long-term stability itself, which meet the use requirements.

Test Example 4

Y6000-2 was added to each of the solution JHHH-1 of Example 9, the solution JHHH-2 of Example 10, the solution JHHHH-3 of Example 11, and the solution JHHHH-4 of Example 12, and resulting four different composite mixtures each were used to conduct a corrosion test on N80 and P110 steels at 60° C. Test results are shown in Tables 5 and 6 below.

TABLE 5

Corrosion rates of different corrosive media for the N80 steel at 60° C.

| Material | Corrosive medium | Corrosion rate (mm a$^{-1}$) | Corrosion inhibition rate/% |
|---|---|---|---|
| N80 | JHH-2 + Y6000-2 | 0.2559 | |
| | JHHH-1 + Y6000-2 | 0.0379 | 85.19 |
| | JHH-2 + Y6000-2 | 0.2559 | |
| | JHHH-2 + Y6000-2 | 0.0342 | 86.65 |
| | JHH-2 + Y6000-2 | 0.2559 | |
| | JHHH-3 + Y6000-2 | 0.0188 | 92.65 |
| | JHH-2 + Y6000-2 | 0.2559 | |
| | JHHH-4 + Y6000-2 | 0.01879 | 92.65 |

TABLE 6

Corrosion rates of different corrosive media for the P110 steel at 60° C.

| Material | Corrosive medium | Corrosion rate (mm a$^{-1}$) | Corrosion inhibition rate/% |
|---|---|---|---|
| P110 | JHH-2 + Y6000-2 | 0.3359 | — |
| | JHHH-1 + Y6000-2 | 0.03367 | 89.97 |
| | JHH-2 + Y6000-2 | 0.3359 | — |
| | JHHH-2 + Y6000-2 | 0.0222 | 93.39 |
| | JHH-2 + Y6000-2 | 0.3359 | — |
| | JHHH-3 + Y6000-2 | 0.03247 | 90.33 |
| | JHH-2 + Y6000-2 | 0.3359 | — |
| | JHHH-4 + Y6000-2 | 0.01538 | 95.42 |

It can be seen from Tables 5 and 6 that, as an amount of the corrosion inhibitor increases, corrosion rates of N80 and P110 steels gradually decrease, and corrosion inhibition rates for the steels gradually increase. When an amount of the corrosion inhibitor is 1% to 7% of an amount of a polymer solution, corrosion rates of N80 and P110 steels both are lower than an oilfield corrosion control standard (0.076 mm/a), and corrosion inhibition rates for the steels reach 85% or more. When the amount of the corrosion inhibitor is 7%, corrosion inhibition rates for the steels reach 92% or more.

Test Example 5

Y6000-2 was added to the solution JHHH-4 of Example 12, and was named HKBHY and subjected to an anti-corrosion test, long-term thermal insulation evaluation, and flow recovery evaluation on N80 and P110 steels at different temperatures. Test results are shown in Tables 7, 8, and 9, FIG. 1, and FIG. 2.

TABLE 7

Corrosion rates of different corrosive media
for the N80 steel at different temperatures

| Material | Temperature/° C. | Corrosive medium | Corrosion rate (mm a$^{-1}$) | Corrosion inhibition rate/% |
|---|---|---|---|---|
| N80 | 30 | JHH-2 + Y6000-2 | 0.0664 | — |
|  |  | HKBHY | 0.0068 | 89.76 |
|  | 60 | JHH-2 + Y6000-2 | 0.2559 | — |
|  |  | HKBHY | 0.0171 | 93.32 |
|  | 90 | JHH-2 + Y6000-2 | 0.7726 | — |
|  |  | HKBHY | 0.0445 | 94.24 |

TABLE 8

Corrosion rates of different corrosive media
for the P110 steel at different temperatures

| Material | Temperature/° C. | Corrosive medium | Corrosion rate (mm a$^{-1}$) | Corrosion inhibition rate/% |
|---|---|---|---|---|
| P110 | 30 | JHH-2 + Y6000-2 | 0.0404 | — |
|  |  | HKBHY | 0.0029 | 92.82 |
|  | 60 | JHH-2 + Y6000-2 | 0.3359 | — |
|  |  | HKBHY | 0.0325 | 90.32 |
|  | 90 | JHH-2 + Y6000-2 | 0.6523 | — |
|  |  | HKBHY | 0.0342 | 94.75 |

TABLE 9

Flow recovery performance evaluation of HKBHY

| Rotational speed/(r min$^{-1}$) | Φ600 | Φ300 | Φ200 | Φ100 | Φ | Φ | n |
|---|---|---|---|---|---|---|---|
| Viscometer reading of HKBHY just prepared | 113 | 88 | 76 | 60 | 2 | 2 | 0.50 |
| Viscometer reading of HKBHY placed for 48 h | 119 | 89 | 74 | 63 | 2 | 2 | 0.42 |

Figure 2:
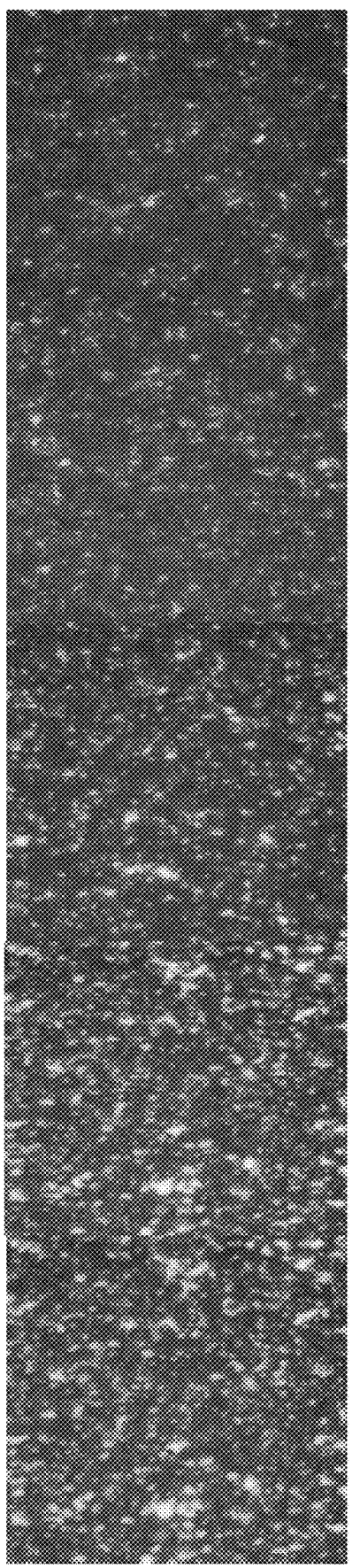
FIG. 2 shows microscopy images of an annulus protection fluid (HKBHY) during long-term placement.

It can be seen from Table 7 that corrosion rates of the N80 steel in HKBHY all are lower than the oilfield corrosion control standard, and corrosion inhibition rates of HKBHY at different temperatures all are 89% or more, where a corrosion inhibition rate of HKBHY at 90° ° C. reaches 94% or more, indicating that HKBHY has an excellent corrosion inhibition effect for the N80 steel. It can be seen from Table 8 that corrosion rates of the P110 steel in HKBHY all are lower than the oilfield corrosion control standard, and corrosion inhibition rates of HKBHY at different temperatures all are 90% or more, where a corrosion inhibition rate of HKBHY at 90° ° C. reaches 94% or more, indicating that HKBHY has an excellent corrosion inhibition effect for the P110 steel. It can be seen from FIG. 1 that the thermal insulation performance of HKBHY is relatively stable within two months, and a thermal conductivity slightly decreases. In order to explain a reason for the decline, corresponding microscopic observation was conducted. Observation results are shown in FIG. 2. It can be seen that, under a microscope, in a solution just prepared or placed for 7 d, the hollow glass microspheres are not very evenly dispersed, and the significant accumulation of hollow glass microspheres can be observed. Because the hollow glass microspheres can be pulled up and down due to a viscosity of the solution, after the solution is allowed to stand for 14 d, 30 d, and 60 d, the hollow glass microspheres are densely and compactly distributed to fill voids of the solution, which may lead to a slight decrease in a thermal conductivity. It can be seen from Table 9 that a viscosity of HKBHY placed for 48 h is very similar to a viscosity of HKBHY just prepared. Therefore, HKBHY can be considered to have prominent flow recovery performance.

In summary, the anti-corrosion and low-heat-conduction annulus protection fluid system in the present disclosure has excellent thermal insulation performance, stability, corrosion resistance, and flow recovery performance, which can meet the requirements of on-site construction.

What is claimed is:

1. An anti-corrosion and low-heat-conduction annulus protection fluid for a deep-sea oil and gas exploitation, comprising the following raw materials: a polymer solution: 100 parts, a first clear water: 100 parts to 500 parts, a thermally-insulating material: 20 parts, a corrosion inhibitor: 1 part to 7 parts, and xanthan gum: 0.3 parts to 0.5 parts;
   wherein a raw material composition of the polymer solution is a mixture solution of a polymer and a second clear water, based on a mass ratio, the polymer: the clear water=1:(22-28);
   a raw material composition of the polymer comprises: a third clear water: 100 parts, an acrylamide: 15 parts to 20 parts, 2-acrylamido-2-methylpropanesulfonic acid: 5 parts to 10 parts, a crosslinking agent: 0.1 parts to 0.3 parts, and an initiator: 0.5 parts to 1 part;
   the thermally-insulating material is a hollow glass microsphere; and
   the corrosion inhibitor is ethylenediamine tetra(methylene phosphonic acid) sodium, wherein the anti-corrosion and low-heat-conduction annulus protection fluid is prepared by a method comprising the following specific steps:
   (1) taking 50% to 80% of a mass of the third clear water, adding the acrylamide, the 2-acrylamido-2-methylpropanesulfonic acid, and the crosslinking agent under stirring to obtain a first mixture, and further stirring the first mixture until a resulting solution is transparent to obtain a first solution;
   (2) taking a remaining part of the third clear water, adding the initiator under stirring to obtain a second mixture, and further stirring the second mixture until dissolution to obtain a second solution;
   (3) adding the second solution dropwise to the first solution under stirring to obtain a third mixture, and allowing the third mixture to stand to obtain the polymer;
   (4) mixing the polymer with the second clear water under stirring to obtain the polymer solution;
   (5) mixing the polymer solution with the first clear water under stirring to obtain a third solution;
   (6) pouring the xanthan gum into the third solution under stirring to obtain a fourth mixture, and further stirring the fourth mixture until complete dissolution to obtain a fourth solution, wherein the fourth solution is a complex mixed solution;
   (7) adding the corrosion inhibitor to the fourth solution to obtain a fifth mixture, and thoroughly stirring the fifth mixture to obtain a fifth solution; and
   (8) adding the thermally-insulating material to the fifth solution to obtain a sixth mixture, and thoroughly stirring the sixth mixture to obtain the anti-corrosion and low-heat-conduction annulus protection fluid.

2. The anti-corrosion and low-heat-conduction annulus protection fluid according to claim 1, wherein in the step (3), the third mixture is allowed to stand at 50° C. to 70° C. for 8 h to 12 h.

* * * * *